W. H. PARTON.
TANK.
APPLICATION FILED NOV. 21, 1916.
1,260,024.
Patented Mar. 19, 1918.
2 SHEETS—SHEET 1.
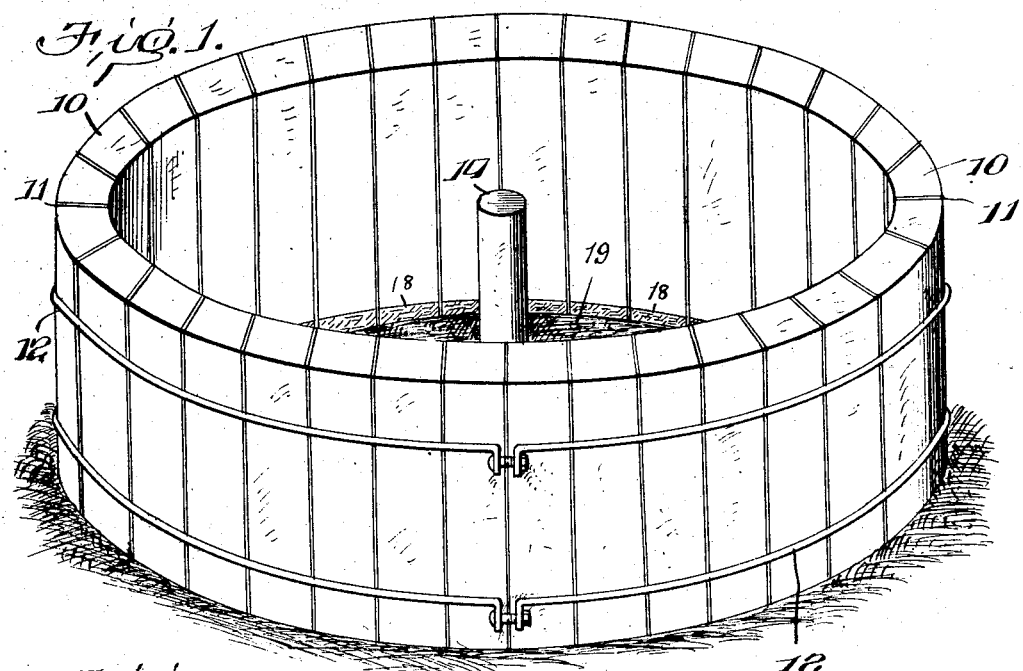
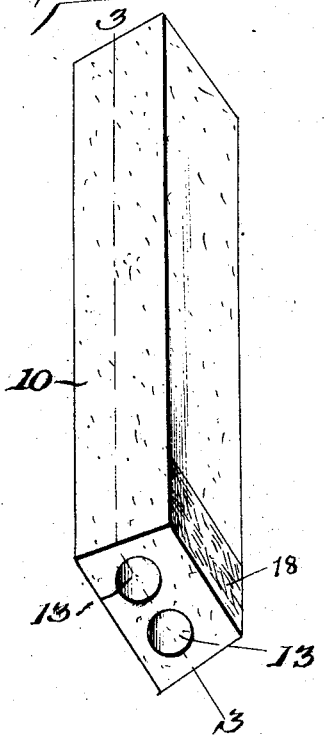
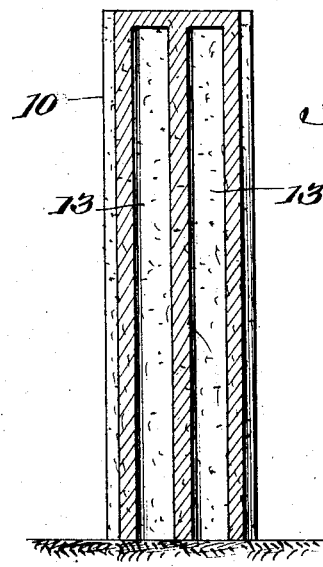
Inventor
W. H. Parton
By _____, Attorneys.

W. H. PARTON.
TANK.
APPLICATION FILED NOV. 21, 1916.
1,260,024.
Patented Mar. 19, 1918.
2 SHEETS—SHEET 2.
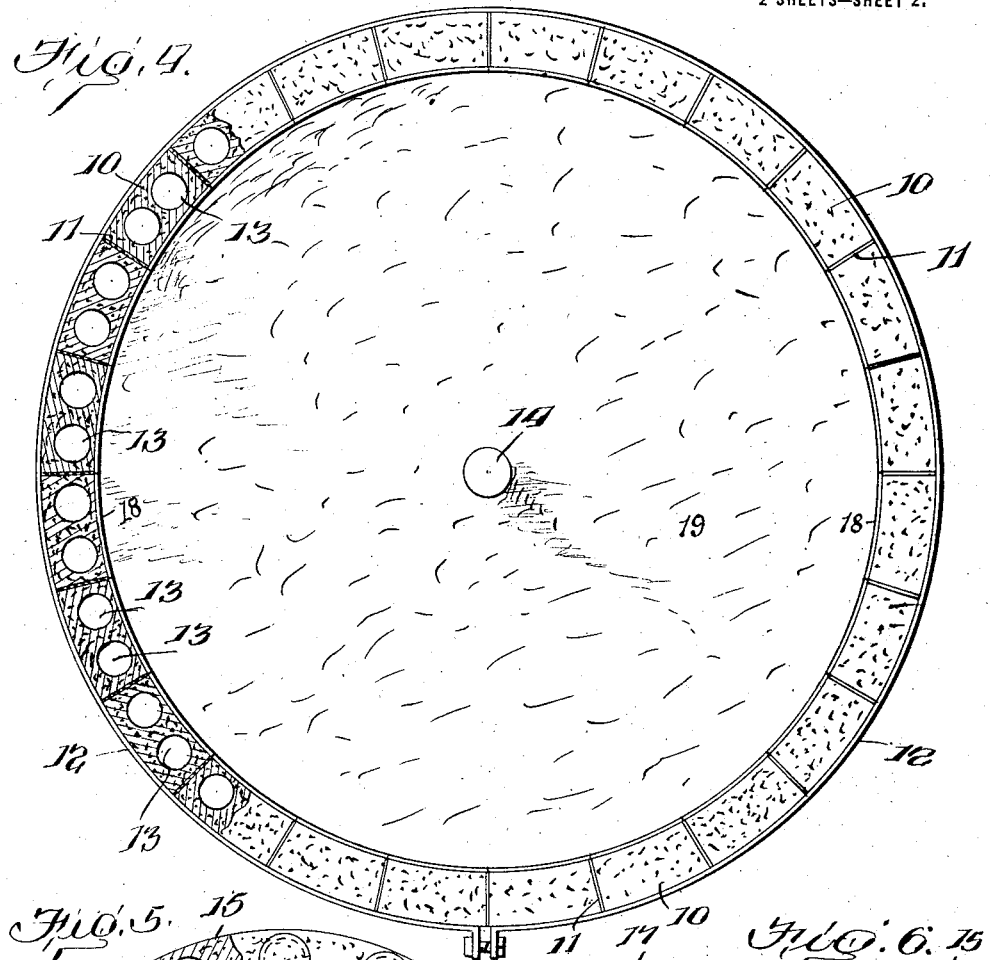
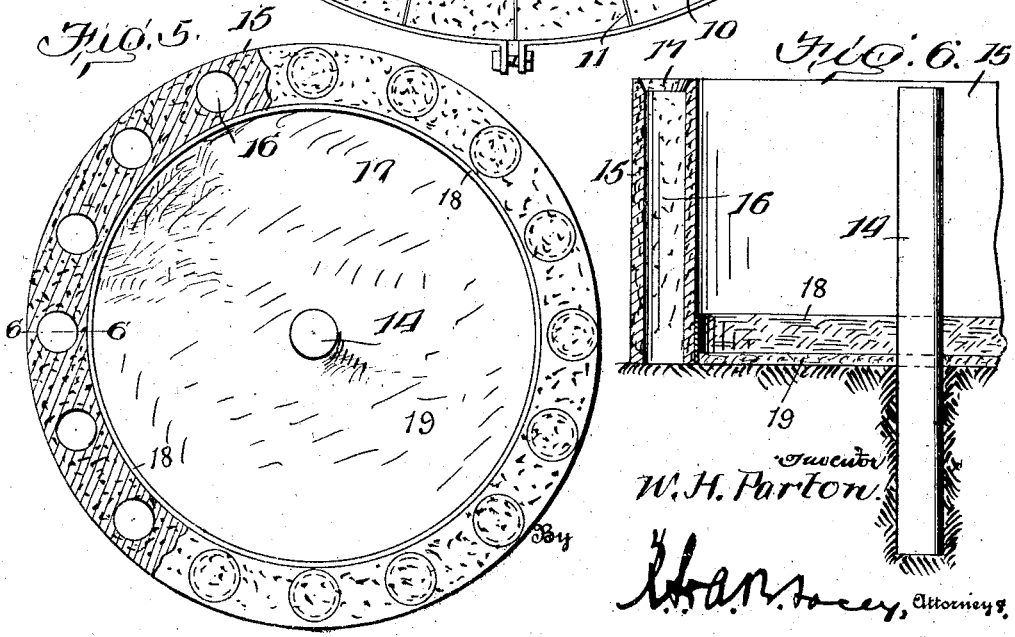
Inventor
W. H. Parton

UNITED STATES PATENT OFFICE.

WILLIAM H. PARTON, OF LINCOLN, NEBRASKA.

TANK.

1,260,024.　　　　Specification of Letters Patent.　　Patented Mar. 19, 1918.

Application filed November 21, 1916. Serial No. 132,659.

*To all whom it may concern:*

Be it known that I, WILLIAM H. PARTON, a citizen of the United States, residing at Lincoln, in the county of Lancaster and State of Nebraska, have invented certain new and useful Improvements in Tanks, of which the following is a specification.

This invention relates to improvements in tanks for holding liquids, more particularly watering tanks for stock, and has for one of its objects to provide a device of this character constructed entirely from cement and so arranged as to be non-freezing in cold weather and which may be readily moved from place to place and erected wherever desired.

Another object of the invention is to provide a device of this character arranged to be located directly upon the ground and without other bottom than the ground beneath the tank which is rendered impervious to water or non-leaking by any suitable means.

Another object of the invention is to provide a tank constructed from a plurality of units and with downwardly opening air spaces communicating with the ground on which the tank is erected.

Another object of the invention is to provide a tank, the walls of which are constructed from concrete or like material and with air spaces within the walls of the tank closed at their upper ends and opening downwardly in communication with the ground on which the tank is located.

With these and other objects in view, the invention consists in certain novel features of construction as hereinafter shown and described and then specifically pointed out in the claim; and in the drawings illustrative of the preferred embodiment of the invention—

Figure 1 is a perspective view of the improved tank in its preferred form,

Fig. 2 is an enlarged detached perspective view from beneath of one of the wall units, Fig. 3 is a sectional elevation on the line 3—3 of Fig. 2, Fig. 4 is a plan view partly in section of the form of structure shown in Fig. 1, Fig. 5 is a view similar to Fig. 4 illustrating a modification in the construction, Fig. 6 is a sectional detail on the line 6—6 of Fig. 5.

The improved device comprises a tank or like structure, preferably formed from concrete or like material and formed without a bottom or top and resting by its lower edge directly upon the ground. If the ground is of such nature that it can be rendered impervious to water by pounding or rolling, as in some cases, the ground is thus first treated. If found necessary, the ground will be treated by adding ashes, air slaked lime, or like material and rolling or pounding the same or otherwise treating it to render the ground impervious to water so that when the tank is located upon the ground, the water will not leak therefrom through the ground. When constructed as shown in Figs. 1 and 4 of the drawings, with the walls constructed from a plurality of units, the spaces between the units or blocks will be packed with a suitable filling material such as a plurality of thicknesses of waterproofed paper or the like to render the joints between the units waterproof. The blocks or units are of a form similar to the stones of an arch, or tapering toward their inner sides with the inner sides curved to conform to the inner face of the tank while the outer sides of the blocks will be curved to conform to the outer face of the tank, or with the side faces of the blocks radiating toward the central point of the tank. The blocks are indicated conventionally at 10 and the packing between the blocks at 11. The blocks may be of any required length and the number of blocks employed will correspond to the size of the tank. For convenience, the blocks will be about eight inches wide at the outer faces and about two feet high, for an ordinary watering tank, but these dimensions may be varied as required. Suitable binding hoops represented at 12 will be placed around the assembly of units to hold them in position, the bands being provided with draw bolts to hold them in place.

Each block or unit 10 is formed hollow and preferably with two interior cavities represented at 13 in Fig. 3 and opening downwardly and closed at their upper ends, as shown, the lower ends of the cavities communicating with the ground upon which the tank is erected. The cavities thus contain "dead air" and effectually prevent the passage of frost to the water of the tank except in the severest weather. The dead air spaces being closed at their upper ends so that the upper rim of the tank wall is solid, the cooler atmospheric air is prevented from passing into the cavities and thereby chilling the interior of the wall and the lowering of the temperature of the wall by exposure is prevented by the presence of the dead air spaces in the well known manner. As there is always air escaping from the surface of the earth somewhat warmer than the higher atmospheric air, the interior of the wall will be kept at a temperature somewhat above the surrounding air owing to the fact that these warmer air currents will pass into the dead air spaces and will be held therein by the closed upper ends of the same.

Erected at the center of the tank is a post represented at 14 and embedded a sufficient distance in the ground to dispose the lower end below the frost line. The post serves thus as an anti-freezing element operating as a conductor of the warmer temperature of the earth and prevents the water from freezing around the post.

In Fig. 5, the improved device is shown constructed of a continuous wall illustrated at 15 of concrete or like material with openings 16 initially formed entirely therethrough, and the upper ends of the openings closed by filler members indicated at 17 in Fig. 6. The openings 16 thus open downwardly in the same manner as the openings shown in Figs. 1 to 4 after the filler members are arranged in position. The arrangement shown in Fig. 5 will be employed for the smaller class of tanks, but when the larger tanks are to be used, the walls will be constructed of a plurality of units as shown in Figs. 1 and 4. When the walls are continuous as shown in Fig. 5, the binding elements 12 will not be required.

Under some circumstances, it may be desirable to employ a concrete or cement floor for the tank, and when this is done, in a tank constructed from a plurality of units or staves as in Figs. 1 and 4, a strip of suitable material such as waterproof paper, represented at 18, is pasted or otherwise supported upon each unit at its lower end, and the floor material, represented at 19, deposited when in a plastic state upon the ground within the tank, the paper strips preventing the material of the floor from adhering to the units of the tank. When the floor material is employed in a tank formed with a continuous wall, as shown in Figs. 5 and 6, the protecting member may be continuous as shown.

The cement bottom is thus separately maintained from the walls of the tank.

The floor material may be concrete, hydraulic cement, asphalt, or any other suitable material or compound or combination of materials which will harden with exposure and which will be impervious to moisture, and it is not desired to limit the device to any specific material or compound or combination of materials for the floor of the tank when such floor other than the earth is required.

Having thus described the invention, what is claimed as new is:

A tank comprising an impervious earthen base, a wall consisting of hollow blocks with vertical voids having one end open and resting directly on the earth without any intermediate foundation, and the top closed to form a solid rim around the tank.

In testimony whereof I affix my signature.

WILLIAM H. PARTON. [L. S.]

Copies of this patent may be obtained for five cents each, by addressing the "Commissioner of Patents, Washington, D. C."